US006990120B1

(12) United States Patent
Lindgren et al.

(10) Patent No.: US 6,990,120 B1
(45) Date of Patent: Jan. 24, 2006

(54) METHODS FOR CHANGING THE BANDWIDTH OF A CIRCUIT SWITCHED CHANNEL

(75) Inventors: Per Lindgren, Stockholm (SE); Christer Bohm, Nacka (SE); Lukas Holm, Stockholm (SE); Magnus Danielson, Stocksund (SE); Anders Boström, Solna (SE)

(73) Assignee: Net Insight AB, Stockholm (SE)

( * ) Notice: Subject to any disclaimer, the term of this patent is extended or adjusted under 35 U.S.C. 154(b) by 0 days.

(21) Appl. No.: 09/786,889

(22) PCT Filed: Sep. 9, 1999

(86) PCT No.: PCT/SE99/01573

§ 371 (c)(1),
(2), (4) Date: Jun. 15, 2001

(87) PCT Pub. No.: WO00/16522

PCT Pub. Date: Mar. 23, 2000

(30) Foreign Application Priority Data

Sep. 10, 1998 (SE) ................................ 9803068

(51) Int. Cl.
H04L 12/43 (2006.01)
H04B 7/212 (2006.01)
H04J 3/00 (2006.01)

(52) U.S. Cl. .................... 370/468; 370/442; 370/458

(58) Field of Classification Search ........ 370/369–393, 370/437–442, 458–468, 471–477; 709/229, 709/230

See application file for complete search history.

(56) References Cited

U.S. PATENT DOCUMENTS

| 4,980,886 | A | | 12/1990 | Bernstein ...................... 370/80 |
| 5,157,657 | A | | 10/1992 | Potter et al. .................. 370/85 |
| 5,229,992 | A | | 7/1993 | Jurkevich et al. ............. 370/82 |
| 5,517,499 | A | * | 5/1996 | Gauffin et al. ............... 370/503 |
| 5,838,687 | A | * | 11/1998 | Ramfelt ...................... 370/443 |
| 6,157,656 | A | * | 12/2000 | Lindgren et al. ........... 370/458 |
| 6,430,180 | B1 | * | 8/2002 | Bohm et al. ................ 370/369 |
| 6,587,472 | B1 | * | 7/2003 | Antal et al. ................. 370/442 |
| 2002/0126687 | A1 | * | 9/2002 | Lindgren et al. ........... 370/442 |
| 2002/0126688 | A1 | * | 9/2002 | Lindgren et al. ........... 370/442 |

FOREIGN PATENT DOCUMENTS

| WO | WO 97/24846 | 7/1997 |
| WO | WO 97/36403 | 10/1997 |

* cited by examiner

Primary Examiner—Man U. Phan
Assistant Examiner—Marcia Gordon
(74) Attorney, Agent, or Firm—Finnegan, Henderson, Farabow, Garrett & Dunner, L.L.P.

(57) ABSTRACT

The present invention relates to methods for changing the bandwidth of a circuit switched channel in a time division multiplexed network, wherein said channel comprises a set of time slots within each recurring frame of a bitstream between a first node and a second node. According to the invention one or more additional time slots within each recurring frame of said bitstream are reserved, including using, during a period of time, only said set of time slots for transmitting payload data pertaining to said channel while providing, during said period of time, information indicating that said one or more additional time slots are currently not used for transferring payload data. After said period of time, said set of time slots is used as well as said one or more additional time slots on said bitstream for transmitting payload data pertaining to said channel.

34 Claims, 7 Drawing Sheets

METHODS FOR CHANGING THE BANDWIDTH OF A CIRCUIT SWITCHED CHANNEL

TECHNICAL FIELD OF INVENTION

The present invention relates to methods changing the bandwidth of a circuit switched channel in a time division multiplexed network, said channel comprising a set of time slots within each recurring frame of a bitstream of said network.

BACKGROUND OF THE INVENTION

In recent years, the need for network solutions providing quality of service in high bandwidth applications has evolved as a result of the increasing demand for transfer of, e.g., real-time speech, video and multimedia over networks such as the Internet.

The use of circuit switched networks, which have the inherent property of providing each host with a guaranteed bandwidth, has been found to provide many advantageous features in this context.

A new circuit switched network solution, which has received much interest over the last few years, is known as DTM (Dynamic synchronous Transfer Mode). In a DTM network, circuit switched isochronous channels may be dynamically established, modified, and terminated based upon changes in user capacity requirements.

An advantage with DTM is that the bandwidth of an established isochronous channel may be dynamically changed by the allocation or deallocation of time slots to said channel. However, changing the bandwidth of an existing channel requires synchronization between sender and receiver(s), as well as intermediate nodes, to avoid losing data (in case the sender increases the number of slots allocated to a channel before the receiver does), or to avoid receiving garbage data (if the receiver increases the number of slots allocated to said channel before the sender does).

Different suggestions have been made of how to arrange the necessary bandwidth change synchronization to avoid these problems. One suggested solution has been to simply stop sending data while the bandwidth change is being performed. However, this means that the channel is unused during a period of time, thus inevitably leading to a waste of bandwidth resources. Another suggested solution has been to ensure that the bandwidth change is being made simultaneously at sender, receiver, and any intermediate nodes, by numbering the network frames and, using control signaling for agreeing on which specific frame to effectuate the change. This of course has the drawback of requiring extra signaling and the provision of an often complicated frame counting mechanism.

In view of the above, an object of the invention is to provide a simple, reliable, safe and effective mechanism for synchronizing bandwidth changes in a circuit switched networks of the kind mentioned in the introduction, especially in a DTM network.

SUMMARY OF THE INVENTION

The above mentioned and other objects of the invention are achieved by the invention as claimed in the accompanying claims.

Hence, according to one aspect of the invention, there is provided a method of the kind mentioned in the introduction, said method being used when increasing the bandwidth of a channel and being characterized by: reserving, for said channel, one or more additional time slots within each recurring frame of said bitstream, including using, during a period of time, only said set of time slots for transmitting payload data pertaining to said channel while providing, during said period of time, information indicating that said one or more additional time slots are currently not used for transferring payload data; and using, after said period of time, said set of time slots as well as said one or more additional time slots on said bitstream for transmitting payload data pertaining to said channel.

According to another aspect of the invention, there is provided a method of the kind mentioned in the introduction, said method being used when decreasing the bandwidth of a channel and being characterized by: using, during a period of time, only a portion of said set of time slots for transmitting payload data pertaining to said channel while providing, during said period of time, information indicating that the remaining time slots of said set of time slots are curretly not used for transferring payload data; and deallocating, after said period of time, said remaining time slots from said channel while continuing using said portion of said set of time slots for transmitting payload data pertaining to said channel.

The invention is thus based upon the idea of not using, during the bandwidth change, those time slots that are to be allocated/deallocated to/from a channel (or at least a number of time slots (within the channel) corresponding to the number of time slots that are to be allocated/deallocated to/from the channel), and to provide the bitstream with information designating them as providing invalid data, i.e. as not payload data, typically by marking these time slots as being idle, while at the same time using those time slots that are to be unchanged (i.e. slot already belonging to the channel in the case of a bandwidth increase, or slots that are not to be deallocated from the channel in the case of a bandwidth decrease) for transferring payload data.

For example, if a sending node wants to allocate additional resources to a channel, it may at any time reserve additional time slots on the bitstream that it is connected to, as long as it marks the additional time slots as being idle and only transmits payload data in the time slots that already belonged to the channel prior to said allocation. When the sending node later receives information indicating that downstream nodes have allocated the desired extra bandwidth to the channel and/or are "listening"to the additional time slots, the sending node may at any time discontinue transmitting said information designating said additional time slot as being idle and instead start transmitting payload data using said additional time slots as well.

Consequently, said period of time will preferably end with, or shortly after, the reception at the sending node of information indicating that concerned downstream nodes switching or receiving said channel have allocated the desired extra bandwidth to the channel and are listening thereto and/or are ready to switch data received therein. However, according to an alternative embodiment, said period of time will be fixed period of time. In such a case, the sending node, after having sent a request for additional capacity to concerned downstream nodes, and after having waited said fixed period of time, will assume that any intermediate nodes switching said channel, and the receiving node listening to said channel, will have had enough time to allocate the necessary resources and to provide the necessary mapping. The sending node will thus simply assume that the extra resources are"up and running" and consequently start transmitting payload data in said additional time slots. This, of course, may in some cases result in loss of data, but will on the other hand provide a simpler mechanism requiring less signaling.

Similarily, having received instructions to allocate additional resources to an existing channel, an intermediate node switching said channel may for example at any time allocate additional time slots to said channel on the outgoing bitstream that the channel is switched to as long as the intermediate node provides the outgoing bitstream with information indicating those time slots of the outgoing bitstream that are so far not transferring payload data. When having received instructions as to which time slots that constitute said additional resources slots on said incoming bitstream, and having made sure that concerned downstream nodes have acknowledged the bandwidth increase, the intermediate node will provide the necessary mapping of data with respect to the added time slots and will discontinue transmitting said information indicating that said additional time slots are so far not transferring payload data.

In other words, the acknowledgement that the additional bandwidth is accepted is preferrably performed backwards, starting from the receiving node. When having made the neccessary arrangements for listening to the new bandwidth, it will notify the upstream next hop intermediate node handling the channel that it is ready to receive payload data in the new slots. The last intermediate node will then, having made its neccesarry arrangements for switching the added slots, notify its upstream next hop intermediate node similariy, and so on. When, finally, the intermediate node located closest to the sending node notifies the sending node that the added bandwidth is accepted all the way, the sending node may, at any time, start using the additional time slots for transmitting payload data.

The invention is also advantageous in the context of multi- or broadcasted channels having several receivers. According to one embodiment of the invention, if wanting to make sure that there is no data loss or the like at any one of the receivers of the channel, before discontinuing sending idle markings in the added time slots, each intermediate node shall make sure to receive information indicating that all downstream nodes receiving or switching said channel have acknowledged the bandwidth change before the intermediate node may go ahead and send an acknowledgement of (and start mapping from/to) the added time slots to the sender or the upstream next hop intermediate node. Thus, when the sender has received one or more acknowledgements indicating that all nodes receiving or switching said channel are "listening" to the added time slot, it may at any time start sending payload data thereon.

An advantage of the invention is thus that the need for stringent bandwidth change synchronization between nodes involved in the management of a channel is relaxed. Using the invention, the sending, receiving, and intermediate nodes may, separately and with comparatively relaxed synchronization requirements, allocate additional time slots and start using additional time slots, as long as said additional time slots are for the time being marked as being idle, i.e. not providing payload data. When control signaling between nodes then indicate that the channel from sender to receiver is "up and running", the sending node may at any time, without any need for notifying downstream nodes, simply switch from marking said additional time slots as idle to transmitting payload data into said additional time slots.

Similarly, when decreasing the size of a channel, the sending node may, for example, simply stop transmitting payload data in one or more time slots to be deallocated from the channel, and instead start marking said one or more time slots as being idle, thereby making sure that downstream nodes will not consider data provided in said one or more time slots as valid payload data, while continuing transmitting payload data in those time slots that are not to be deallocated. The sending node may then, at any time, instruct downstream nodes, such as the receiving node or an intermediate node, to deallocate resources corresponding to said one or more time slots from said channel. Each intermediate node, when having received confirmation from downstream nodes that they are aware that the subject resources are no longer to be part of the channel, may then, at any time, completely deallocate said one or more time slots from the channel without any further need for synchronizing the deallocation with other nodes, also informing upstream nodes that it is no longer listening to the deallocated time slots.

According to a preferred embodiment of the invention, the herein discussed bandwidth change instructions and/or bandwidth change acknowledgements are preferably transmitted between nodes using control channels that are established to comprise one or more time slots on the bitstreams of the network but are separated from the payload carrying channels, thereby not interfering with the ongoing traffic.

A very advantageous aspect of the invention is thus that the decisions at different nodes as to when to allocate and start using additional time slots, or when to stop using and deallocate time slots, may be made more independently than compared to prior art solutions.

Another important advantage of the invention is that payload data are transmitted (at least if so desired) in the unaffected time slots of the channel while the bandwidth change is being executed, thereby efficiently limiting the degree of temporary bandwidth blocking during the change.

According to a preferred embodiment of the invention, said information indicating that a time slot is not used for transferring payload data is provided by the step of marking said time slot as being idle, typically by sending an idle time slot pattern, for example, using an idle code word if using 8B/10B encoding, into said time slot or by setting a one-bit flag of the time slot to indicate that the time slot is invalid, i.e is not transferring payload data. In such cases, the information stating that a time slot does not transfer payload data is advantageously provided within the time slot itself.

However, the manner in which one or more time slots are marked as not providing payload data may be selected in many other ways. For example, the information indicating that a time slot is not providing payload data need not be provided within the time slot as such, but may be derived from another location or part of the associated bitstream, i.e. using some kind of out of band signaling.

In this context, it is to be noted that the actual writing of a code word, setting of a flag, or out of band signaling may just as well be provided by a link head end node marking by default essentially all slots on the bitstream as idle, thus leaving it up to downstream nodes, such as the transmitting node, to "unmark" those slots that will transfer payload data.

Of course, the degree of dynamics by which the features of the invention may be utilized at the nodes handling a channel will depend upon in which degree the nodes handling the channel are equipped with capability to detect, interpret, and generate said information indicating that a time slot is not providing payload data. However, even if only the receiving node is capable of detecting and discarding idle time slots and only the sending node, and preferrably also intermediate switch nodes, are capable of generating idle data, i.e. of designating time slots not providing payload data as being non-valid, the invention will still come to advantageous use.

Furthermore, if said information designating that a time slot is not providing payload data is provided by the writing of an idle block or code word into said time slot, this information is easily propagated to a next hop bitstream by the simple mapping of the idle block from said time slot to a time slot of the channel on the next hop bitstream. Consequently, no extra processing in addition to mere time slot mapping is in such a case needed at the intermediate node to detect the presence of an idle time slot and to provide the next hop bitstream with corresponding information.

A problem which may arise when allocating additional time slots to a channel (or deallocating time slots from said channel) and when said channel extends over more than one bitstream, is that whereas one node may want to allocate, for example, an additional time slot occupying a time slot position after the last one of the time slots already allocated to the channel on the respective bitstream, another node may want to allocate a time slot position in the middle of the time slots already allocated to the channel, on the respective bitstream, thus potentially cauting re-ordering of data. (Generally, this problematic situation will not occur at nodes that use channel based mapping, since such a node will typically make sure that the sequential order data received within a channel is preserved.)

One way to avoid this problem would be to only allow intermediate nodes to allocate new slots to a channel in the same time slot order as the sending node. However, this would drastically decrease the possibility to set up the channel and thus result in unnecessary blocking.

Another way of solving this problem is to re-configure (referred to herein as "re-mapping") the mapping instructions at each concerned intermediate node so as to ensure that the order of time slot data is preserved even if the position of the "new" time slot with respect to the other time slots allocated to the channel is different on different bitstreams. Such a re-mapping need then to take place before upstream nodes starts to sending or forwarding payload data instead of idle data blocks in said additional time slots.

According to a preferred embodiment of the invention, in order to make sure that said re-mapping doesn't result in that payload data is re-mapped to a slot not yet recognized by a downstream receiving node as belonging to the channel, any re-mapping to be performed among the time slots forming the channel at an intermediate node, as a result of the change of the amount of resources allocated to said channel, is carried out after the acknowledgement of the bandwidth change from downstream intermediate nodes located closer to a receiver of the channel (which nodes as such may also have had to perform re-mapping among the time slots forming the channel at their respective locations), and preferably also before use of the added slots is acknowedge to upstream node being the sender of or switching said channel. In other words, any necessary mapping or re-mapping is preferably performed backwards along with the bandwidth change acknowledgement discussed above, starting from the intermediate node located closest to the receiving node. Preferably, when having received acknowledgement that the receiving node is aware that the additional slots now belongs to the channel, the last intermediate node will perform it's mapping (or re-mapping), and will then notify the upstream next hop intermediate node that the new time slots are in use up to that location, said upstream next hop intermediate node thereby being allowed to perform its own re-mapping, if so desired, and so on. When, finally, the intermediate node located closest to the sending node notifies the sending node that mapping has been established up to that location, the sending node may, at any time, start using the additional time slots for transmitting payload data.

As is understood by those skilled in the art, the way in which the invention is realized, for example with respect to re-mapping issues, will partly, but not necessarily, depend on whether or not channel or slot based mapping is used at the nodes switching said channel.

Even though applicable in many different types of circuit switched time division multiplexed networks using isochronous channels, the most preferred use of the invention is in a so called Dynamic synchronous Transfer Mode (DTM) network, wherein the possibility to dynamically change bandwidth is a very advantageous feature.

For definition, when used herein, the term "isochronous channel" refers to a channel carried on a bitstream wherein the frames of the bitstream occur at a regular pace and wherein the set of time slots defining the channel on that bitstream occupies the same time slot positions within each frame on that bitstream.

Further description of ways to incorporate and detect as such the presence of information designating time slots as not providing payload data may for example be found in the co-pending patent application SE 9703449-0. For specific details on a preferred way of implement idle markings in for example a DTM network, reference may be made to currently ongoing DTM standardization procedure (Ref: ETSI ES 201 803) within the European Telecommunications Standards Institute, ETSI.

Also, even though the invention is described more i detail herein with respect to embodiments wherein signaling takes place between the sending node, the receiving node and posible intermediate nodes switching said channel, embodiments of the invention could just as well be realized using for example signaling to/from one or more "master" nodes that handle all signaling with respect to one or more of the involved channel handling nodes.

The above-mentioned and other aspects, features, and advantages of the invention will be evident from the accompanying claims and from following description of exemplifying embodiments thereof.

BRIEF DESCRIPTION OF THE DRAWINGS

Exemplifying embodiments of the invention will now be described with reference to the accompanying drawings, wherein.

DETAILED DESCRIPTION OF PREFERRED EMBODIMENTS

Figure 1:
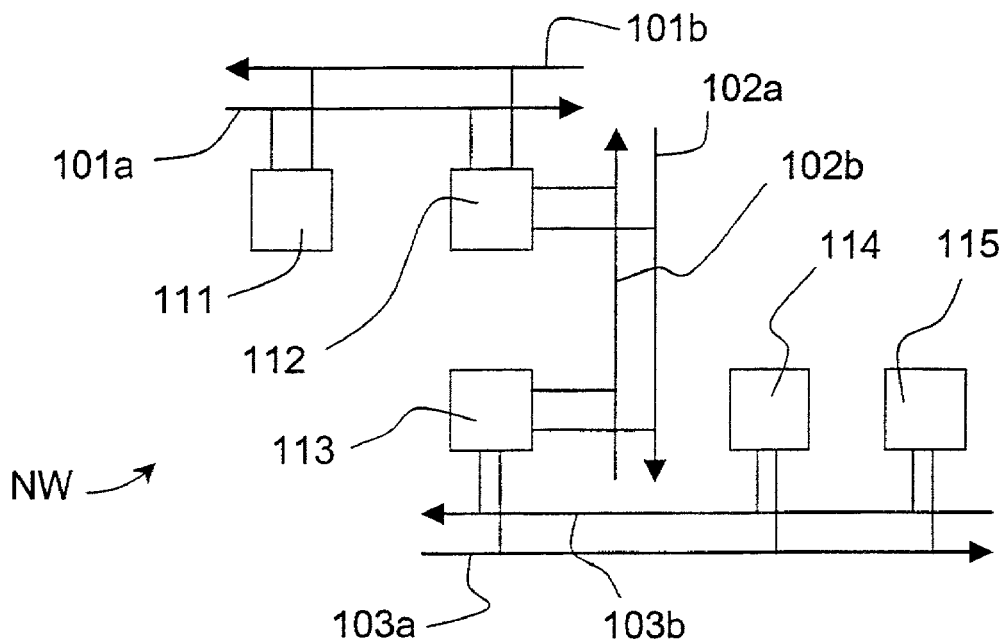
FIG. 1 schematically shows a DTM network.

A time division multiplexed network, in this example being a DTM (Dynamic synchronous Transfer Mode) network, will now be described with reference to FIG. 1. In FIG. 1, five nodes 111–115 are connected via three multi-access bi-directional links, a first one formed by bitstreams 101a and 101b, a second one formed by bitstreams 102a and 102b, and a third one formed by bitstreams 103a and 103b. Nodes 111 and 112 are connected to the first link, nodes 112 and 113 to the second link, and nodes 113–115 to the third link. Consequently, node 112 provides switching between the first and second link and node 113 provides switching between the second and third link.

The data transport structure of the bitstreams in FIG. 1, using bitstream 101a as an example, will now be described with reference to FIGS. 2a–2b.

Figure 2:
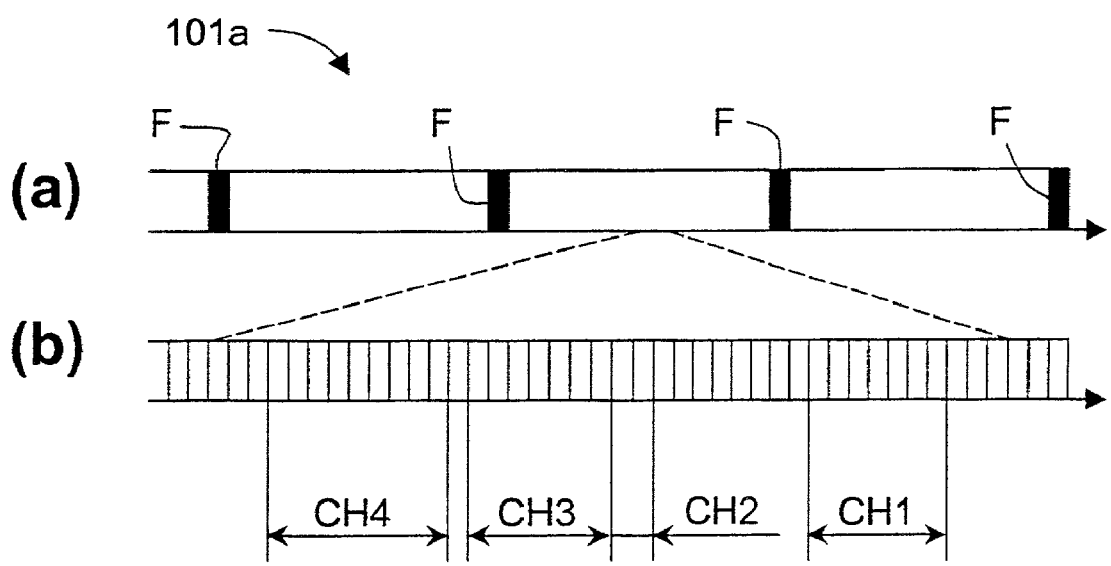
FIG. 2 schematically shows allocation of time slots to channels on a bitstream.

As shown in FIG. 2 at (a), the bitstream 101a is divided into recurrent, essentially fixed sized, e.g. 125 µs, frames. In turns as illustrated at (b), each frame is divided into a plurality of fixed sized, e.g. 64 bit, time slots. As shown at (a), the start of each frame is defined by a frame synchronization time slot F.

The time slots of a frame are generally divided into control slots and data slots. The control slots are used for signaling between the nodes of the network, whereas the data slots are used for the transfer of payload data. The write access to both control slots and data slots are distributed as desired to the nodes having access to the respective bitstream. The nodes uses the data slots to define channels CH1, CH2, CH3, CH4 on the bitstream. In FIG. 2 at (b), it is for example assumed that channel CH1 has been established from node 111 to node 112. As shown, each channel is allocated a respective set of slots. In the example, the transfer capacity of channel CH1 is larger than the transfer capacity of channel CH2, since the number of time slots allocated to channel CH1 within the frame is larger than the number of time slots allocated to channel CH2. The time slots allocated to a channel occupy the same time slot positions within each recurrent frame of the bitstream. As is understood, a channel may be defined over more that one bitstream, then comprising a set of slots on each of the bitstrems that it is defined over. In such a case, switch nodes will perform the necessary mapping of slots from time slot positions on one bitstream to time slot positions on another.

Exemplifying procedures for changing the bandwidth of a channel according to an embodiment of the invention will now be described with reference to FIGS. 3a–3f, all schematically illustrated a simplified view of the DTM network of FIG. 1.

Figure 3A:
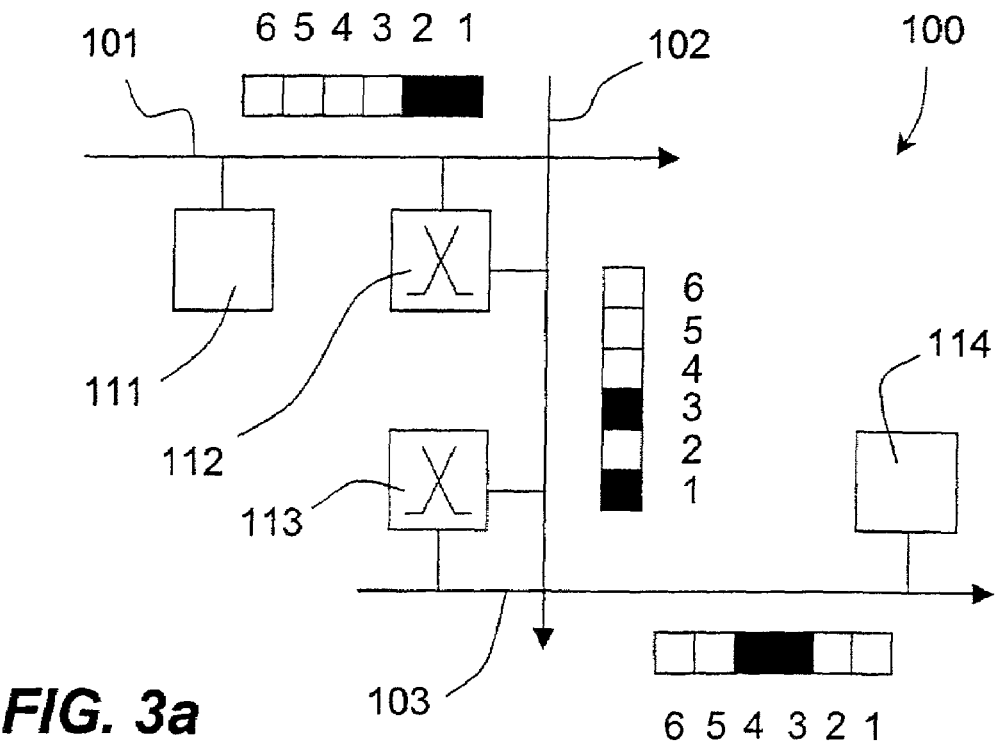
FIGS. 3a–3f schematically illustrates a DTM network and its bitstreams and time slots during a change of channel bandwidth according to an embodiment of the invention.

In FIG. 3a, it is assumed that a circuit switched channel has been established from node 111 to node 114 via nodes 112 and 113. As schematically illustrated in FIG. 3a, the channel is defined to comprise two time slots (marked black in FIG. 3a) within each frame of bitstreams 101, 102, and 103. More specifically, the channel is defined to comprise the first and second time slot within each frame of bitstream 101, the first and third time slot within each frame on bitstream 102, and the third and fourth time slot within each frame on bitstream 103. Consequently, node 112 is arranged to map the content of the first and second time slot on bitstream 101 into the first and third time slot, respectively, on bitstream 102. Likewise, node 113 is arranged to map the content of the first and third time slot on bitstream 102 into the third and fourth time slot, respectively, on bitstream 103.

In this embodiment, node 111 manages allocation of time slots to said channel on bitstream 101, node 112 manages allocation of time slots to said channel on bitstream 102, and node 113 manages allocation of time slots to said channel on bitstream 103.

It is now assumed that, based upon an end user request or for some other reason, node 111 decides to increase the bandwidth of the channel, in this example by one time slot per frame. Preferably using its own pool of free slots, node 111 allocates the desired bandwidth, in this case one slot per frame, to the channel on bitstream 101, in this example the third time slot within each frame.

Figure 3B:
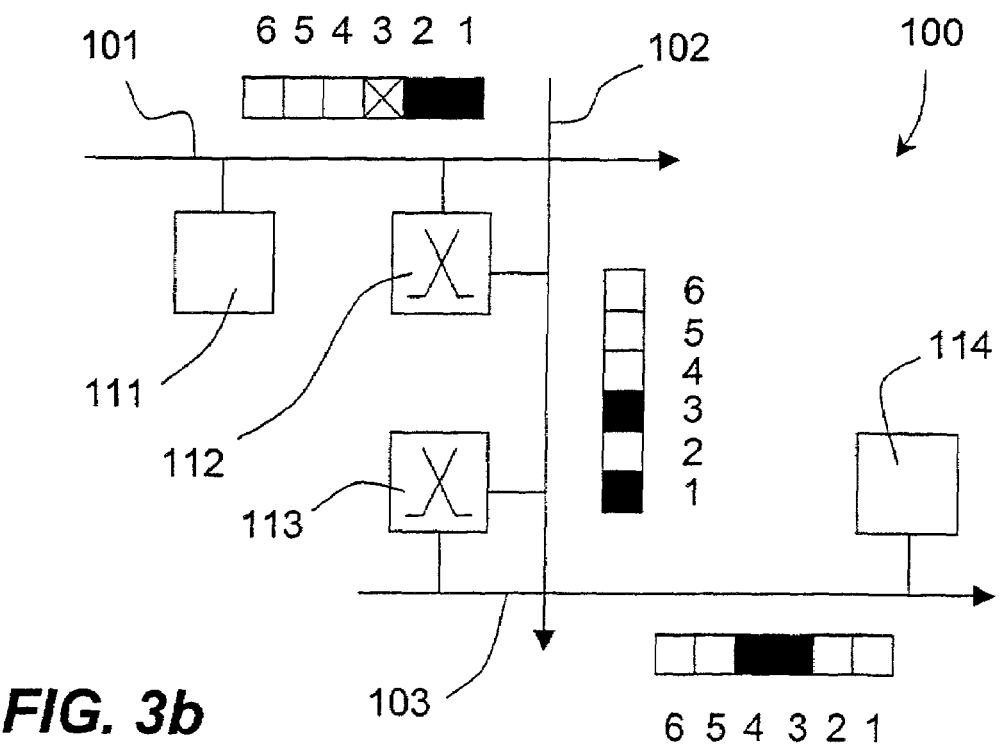
Figure 3C:
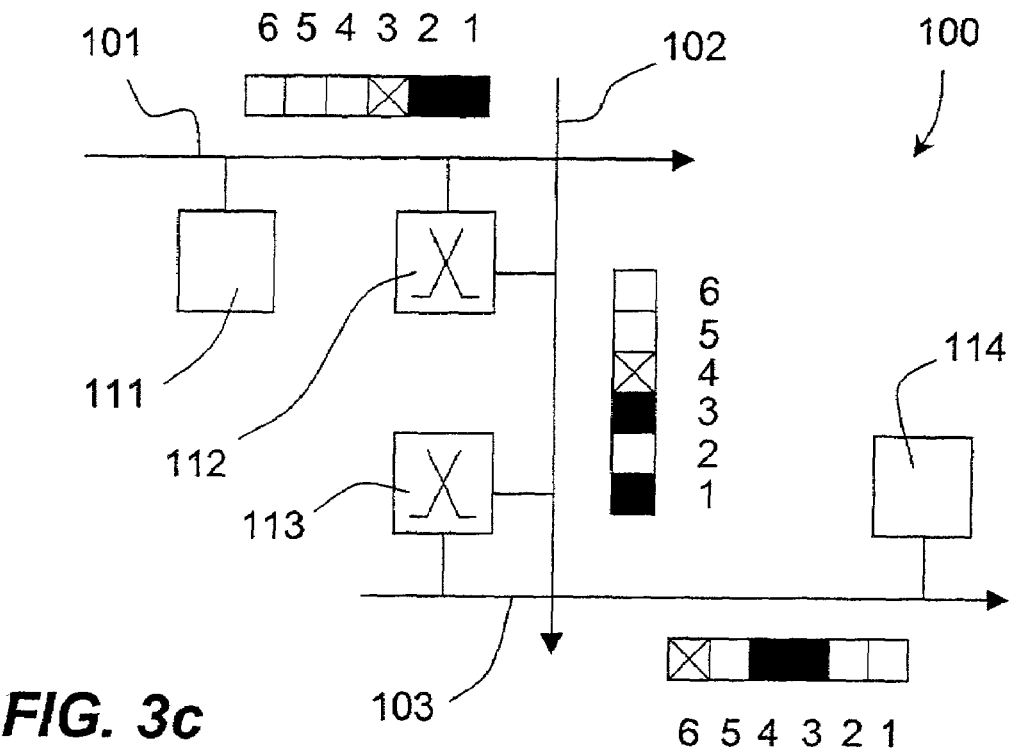

Using control signaling in a channel defined by a control time slot position on bitstream 101, node 111 sends a bandwidth change request to node 112 requesting an increase in the bandwidth allocated to said channel corresponding to one slot per frame and informing node 112 that time slot three on bitstream 101 is now to be part of the channel. At the same time, node 111 continues transmittin payload data in the previously already allocated first and second time slots, and starts transmitting idle markings into the third time slot within each frame of bitstream 101. FIG. 3b illustrates this situation. In FIG. 3b, node 111 has allocated an additional third time slot to said channel on bitstream, and is transmitting payload data into slots one and two and idle markings (as illustrated with an x-marking) into slot three, whereas node 112 and 113 have not yet allocated any additional time slots to said channel on bitstreams 102 and 103.

Since node 112 in the situation shown in FIG. 3b has not yet allocated any additional time slots to the channel on bitstream 102, it has not yet started to map the third time slot from bitstream 101 into bitstream 102.

In a similar manner, preferably using their own pools of free slots, nodes 112 and 113 will correspondingnly allocate the desired bandwidth, in this example one slot per frame, to the channel on bitstreams 102 and 103, respectively. It is thus assumed that node 112 allocates the fourth time slot within each frame of bitstream 102 to said channel, and that node 113 allocates the sixth time slot within each frame of bitstream 103 to said channel. Also, node 112 will transmit an announcement message to node 113 informing which time slot (in this case time slot four) on bitstream 102 is now to be part of the channel, and node 113 will transmit an announcement message to node 114 informing that time slot six on bitstream 103 is now to be part of the channel.

Having been informed of the new time slot, the receiving node 114 will start listening thereto and will acknowledge use of the new slot using an acknowledge message sent in a control channel to node 113. As a result, node 113 may stop sending idle into time slot six on bitstream 103 and instead start mapping data from all three slots on bitstrems 102 to all three slots on bitstream 103.

Having done so, node 113 will acknowledge use of the added time slot to node 112, whereby node 112 may stop sending idle markings into time slot four on bitstream 103 and instead start mapping data from all three slots on bitstrems 101 to all three slots on bitstream 102. Resulting in the idle-mapping situation illustrated in FIG. 3c.

Figure 3D:
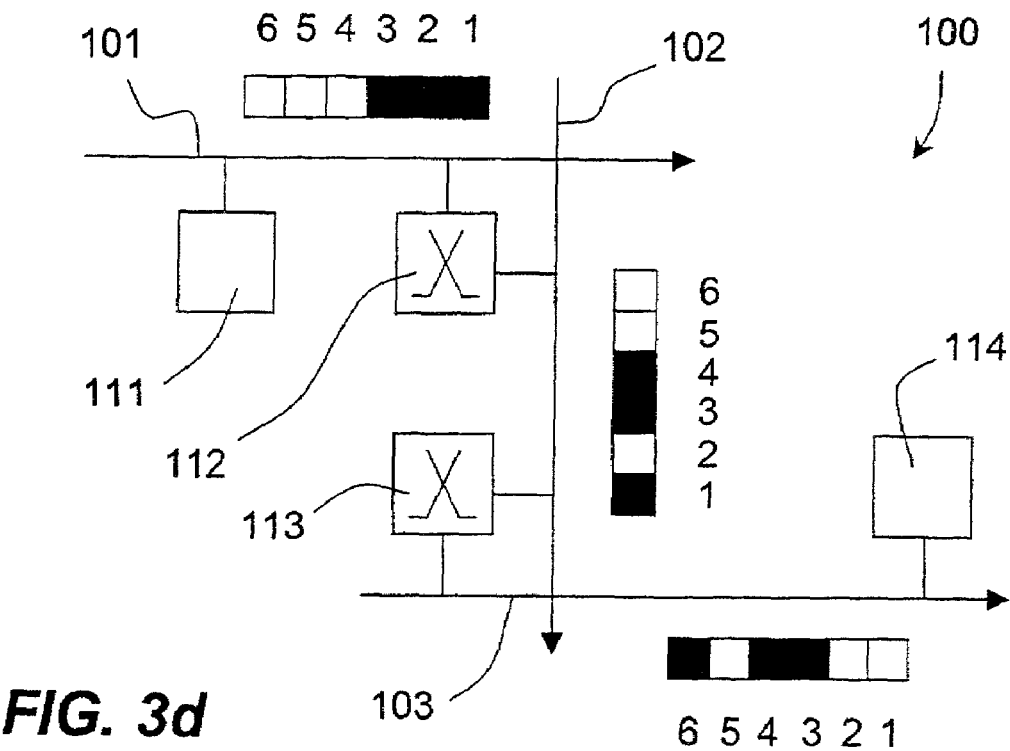

Node 112 will then acknowledge use of the added time slot to node 111, whereby node 111 will determine that it may now go ahead and, at any time, start using the additional time slot for transferring payload data, which will then be mapped by nodes 112 and 113 to reach node 114, as is illustrated in FIG. 3d.

As is understood, if an intermediate node, e.g. node 112 or 113, allocates the requested additional time slot to the channel before the upstream next hop node has had time to allocated a time slot to said channel for said intermediate node to map data from, said intermediate node may still inform a downstream next hop node that said additional time slot is allocated to said channel as long as said intermediate node provides the additional time slot with idle data blocks designating the additional time slot as not providing payload data.

Starting again from FIG. 3a, wherein said circuit switched channel has been established from node 111 to node 114 via nodes 112 and 113, it is now assumed that node 111, based upon an end user request or for some other reasons has decided to decrease the bandwidth of the channel, in this example by one time slot per frame.

Figure 3E:
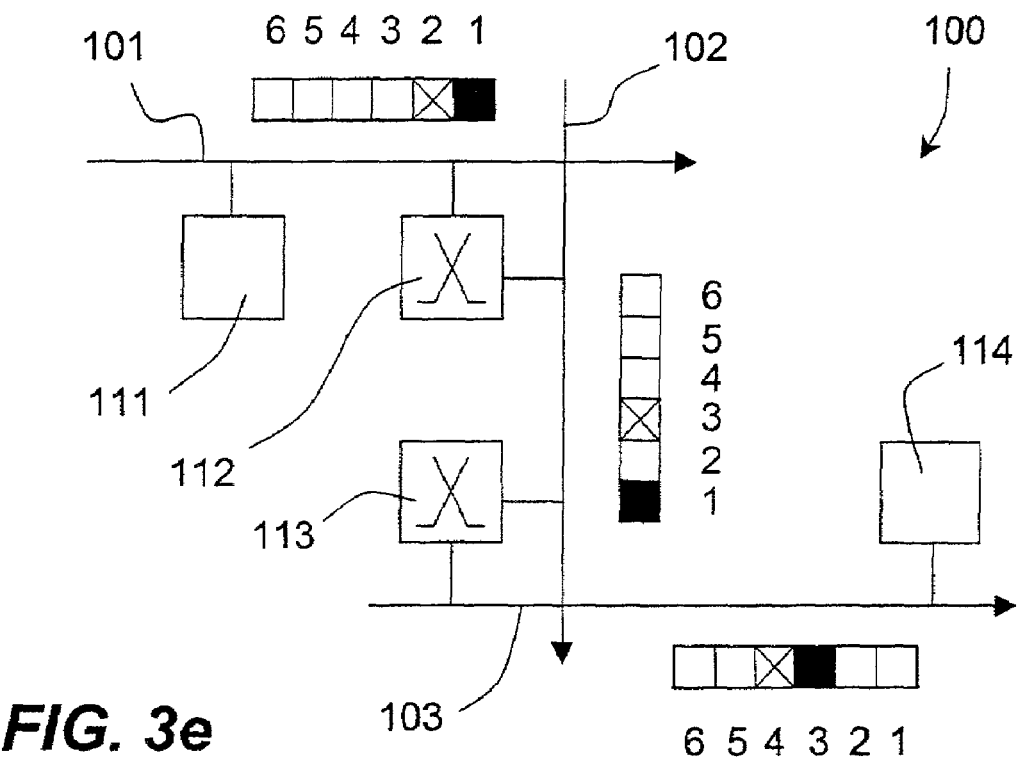

Having decided which time slots to deallocate from said channel, node 111 will start marking the time slot selected to be deallocated as idle, but will continue to transmit payload data into the time slot not selected to be deallocated. In FIG. 3e, node 111 has decided to deallocate the second time slot within each frame on bitstream 101 from said channel and is thus transmitting payload data into slot one and idle markings into slot two (as illustrated with an x-marking), which is then mapped by node 112 and 113 to reach node 114 in time slot four within each frame on bitstream 103. Hence, at this point, the idle marked time slots arriving at node 114 in time slot four of bitstream 103 are consequently discarded by node 114.

Using control signaling, node 111 now instructs node 112, and indirectly (via node 112) node 113, to deallocate the time slot corresponding to time slot two on bitstream 101 from said channel on their respective bitstreams, and also indirectly (via node 113) node 114 that time slot four on bitstream 103 is no longer to be considered part of the channel.

Figure 3F:
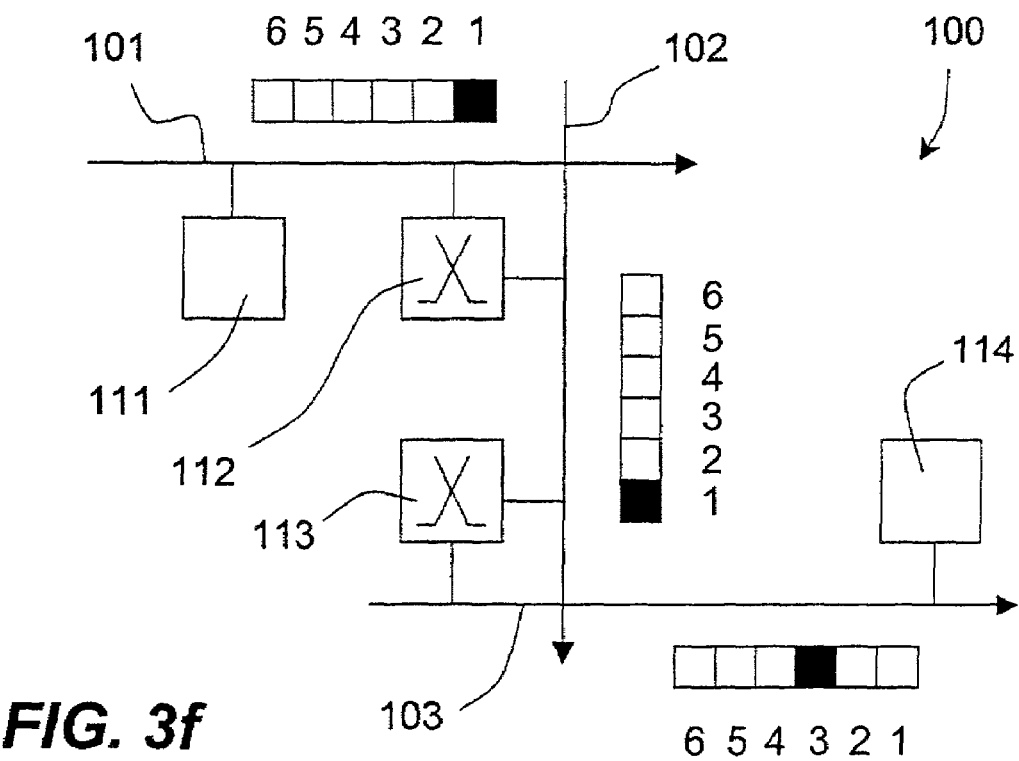

Having received such instructions, and having stoped listening to the so identified time slots, each one of the nodes 112, 113, and 114, will, starting from the receiving node and going down-up in similar to what has been described above, stop using (deallocate) the concerned time slot and send a message acknowledging the bandwidth change confirming that they have performed the requested deallocation. Receiving the final confirmation from node 112, node 111 may at any time deallocate said second time slot on bitstream 101 from said channel, thus leaving only one time slot allocated to said channel, as illustrated in FIG. 3f.

An exemplifying procedure for changing the mapping of time slots when performing a change of bandwidth will now be described with reference to FIGS. 4a–4c.

Figure 4A:
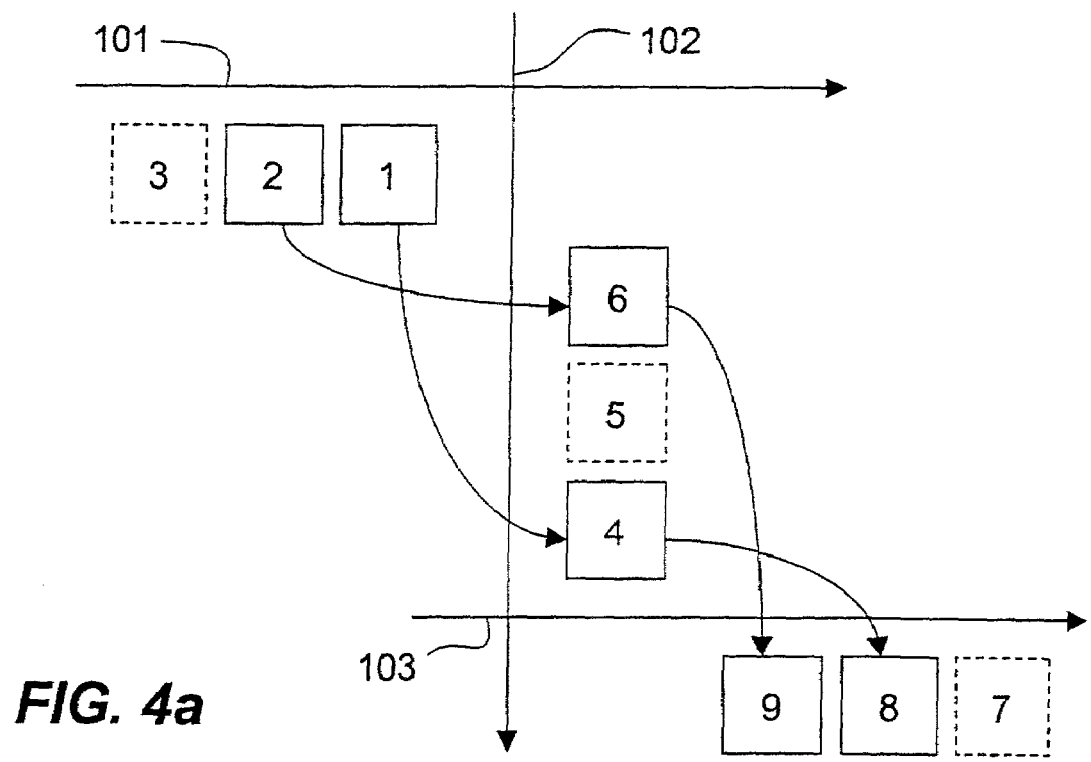
FIGS. 4a–4c schematically illustrates a DTM network during a change of channel bandwidth requiring re-mapping of time slots according to another embodiment of the invention.
Figure 4B:
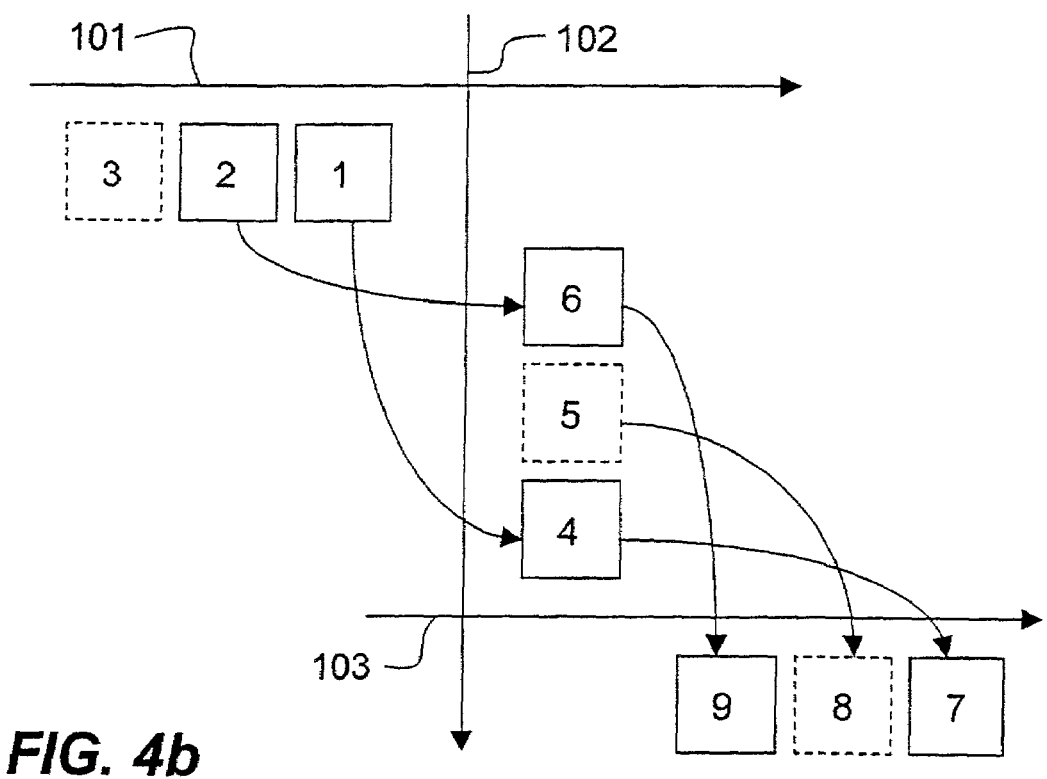
Figure 4C:
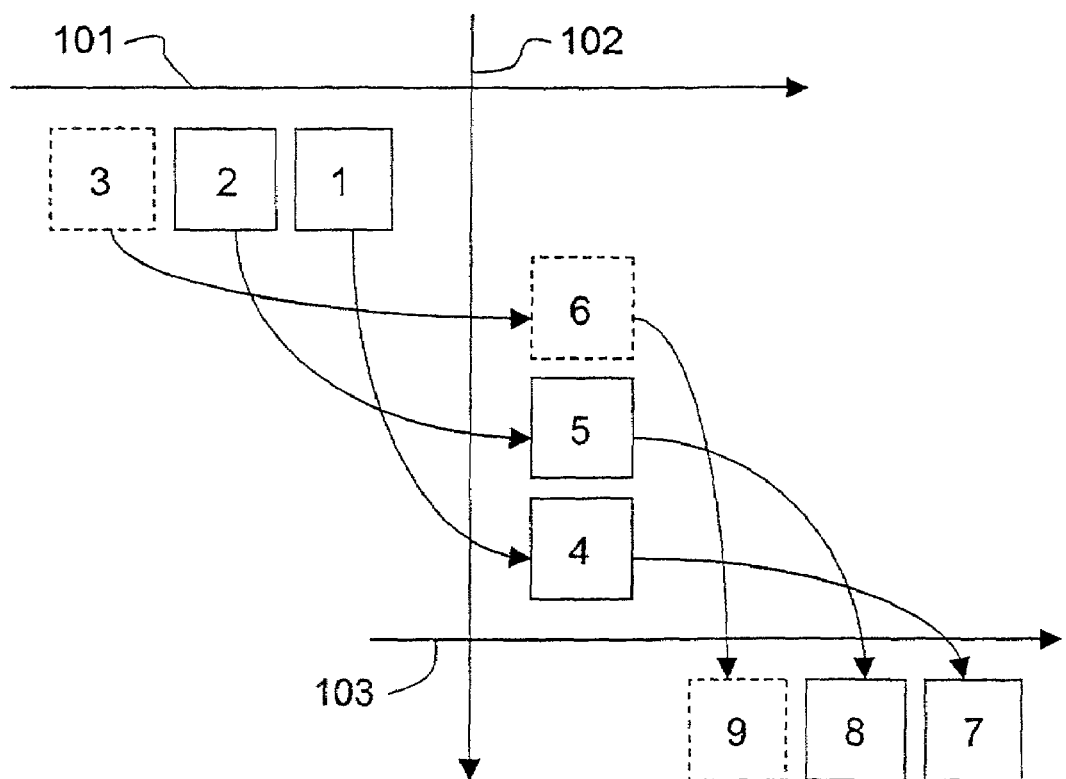

FIGS. 4a–4c schematically show a simplified view of the DTM network of FIG. 1. In FIG. 4a, in similar to FIG. 3a above, it is assumed that a circuit switched channel has been established from a sending node on bitstream 101 to a receiving node on bitstream 103 via two intermediate nodes, wherein the first intermediate node provides time slot mapping between bitstream 101 and bitstream 102 and wherein the second intermediate node provides mapping beteen bitstream 102 and 103. For simplicity, none of these nodes are showed in FIGS. 4a–4c.

As schematically illustrated in FIG. 4a, the channel is defined to comprise the first and second time slot within each frame of bitstream 101, the fourth and sixth time slot within each frame on bitstream 102, and the eighth and ninth time slot within each frame on bitstream 103 (as indicated by full line squares in FIG. 4a). Consequently, the first intermediate node is arranged to map the content of the first and second time slot on bitstream 101 into the fourth and sixth time slot, respectively, on bitstream 102. Likewise, the second intermediate node is arranged to map the content of the fourth and sixth time slot on bitstream 102 into the eighth and ninth time slot, respectively, on bitstream 103.

It is now assumed that the sending node decides to increase the bandwidth of the channel, in this example by one time slot per frame. Using control signaling the sending node sends a request to the intermediate nodes requesting an increase in the bandwidth allocated to said channel corresponding to one slot per frame.

In this example, it is assumed that the sending nodes decides to allocate the third time slot within each frame on bitstream 101 to the channel and start sending idle markings therein (as indicated by the broken line square in FIG. 4a). However, it is also assumed that the second intermediate nodes decides to allocate the fifth time slot within each frame on bitstream 102 and that the second intermediate node decides to allocate the seventh time slot within each frame on bitstream 103. Thus, a slot mapping inconsisteny problem is present, since the allocated additional time slots occupy the last position within the channel on bitstreams 101 and 103, but the second last position on bitstream 102 and the first position on bitstream 103.

Thus remapping is needed. In this embodiment the remapping is performed starting from the last intermediate node. Hence, before the second intermediate node acknowledges the bandwidth change, and after it has received information from the downstream receiving node that it is listening to the added time slots, the second intermediate node will switch to map data so that the fourth time slot on bitstream 102 is mapped to the seventh, newly allocated time slot on bitstream 103 and the newly allocated fifth time slot on bitstream 102 is mapped to the eighth time slot on bitstream 103, as illustrated in FIG. 4b. Only then will it send the acknowledgement to the first intermediate node.

As a next step, having received the acknowledging message from the second intermediate node informing that the mapping at the second intermediate node is complete, the second last, i.e. the first intermediate node may similarity at any time make its mapping decision and will then select to map data in such a way that the second time slot on bitstream 101 is mapped to the fifth, newly allocated time slot on bitstream 102 and the newly allocated third time slot on bitstream 101 is mapped to the sixth time slot on bitstream 102, see FIG. 4c.

When the first intermediate node then acknowledges to the sending node that allocation of resources and the necessary mapping has been accomplished, the sending node may at any time start using the additional time slots for transmitting payload data, as dicussed above.

Figure 5:
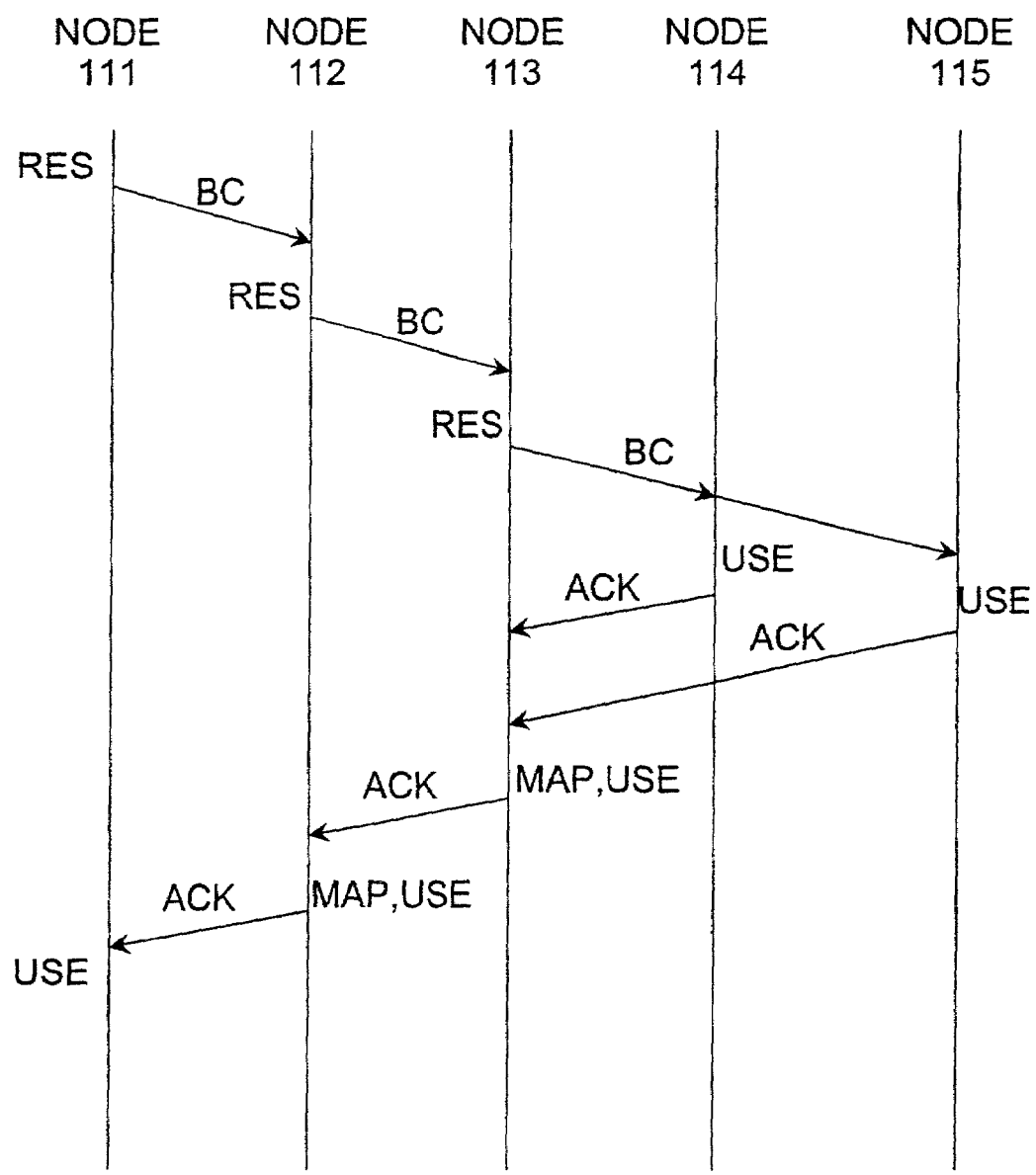
FIG. 5 schematically shows an example of the exchange of messages between nodes during a change of bandwidth according to an embodiment of the invention.

FIG. 5 schematically shows an example of the exchange of messages between the nodes of FIG. 1 during a change of bandwidth according to an embodiment of the invention, much in similar to what has already been described above with reference to FIGS. 3a–3d.

In FIG. 5, to increase the bandwidth of a multicast channel established with node 111 as sender, nodes 114 and 115 as receivers, and nodes 112 and 113 as intermediate switching nodes, node 111 reserves (RES) the required additional slots on its bitstream 101 and, in doing so, starts transmitting idle markings therein (while still transmitting payload data in the channel's original slots). Node 111 then sends a change request message (BC) in a control channel to node 112. Receiving this message, node 112 similarly reserves the required additional slots on its bitstream 102, starts transmitting idle markings therein (while still mapping data from/to the channel's original slots), and sends a similar change request message in a control channel to node 113. Receiving this message, node 113 similarly reserves the required additional slots on its bitstream 103, starts transmitting idle markings therein (while still mapping data from/to the channel's original slots), and sends a similar change request message in a multicasted control channel to nodes 114 and 115.

When the change bandwidth request message from node 113 reaches the receiving node 114, it starts listening (USE) to the added time slots (as well as the channel's original slots) and sends an acknowledging message (ACK) in a control channel to node 113. Similarity, when the change bandwidth request message from node 113 reaches the receiving node 115, it also starts listening (USE) to the added time slots (as well as the channel's original slots) and sends an acknowledging message (ACK) in a control channel to node 113. Having received acknowledgements from both receiving nodes 114 and 115, node 113 performs any necessary re-mapping to start mapping (MAP, USE) data from the new slots as well as the original slots on bitstream 102 into bitstream 103. It then sends an acknowledging message to node 112, and so on. Finally, when the sending node 111 receives an acknowledging message from node 111, it may at any time start using the new time slots for transmitting payload traffic.

The scope of the invention is not to be limited by the exemplifying embodiments thereof disclosed herein, while combinations and modifications thereof, as will be evident for those skilled in the art, may be perforemed within the scope of the invention, which is defined by the accompanying claims.

What is claimed is:

1. A method for increasing the bandwidth of a circuit switched channel in a time division multiplexed network, said channel comprising a set of time slots within each recurring frame of a bitstream of said network, said method comprising the steps of:

reserving, for said channel, one or more additional time slots within each recurring frame of said bitstream, including using, during a period of time, only said set of time slots for transmitting payload data pertaining to said channel while providing, during said period of time, information indicating that said one or more additional time slots are currently not used for transferring payload data; and using, after said period of time, said set of time slots as well as said one or more additional time slots on said bitstream for transmitting payload data pertaining to said channel.

2. A method as claimed in claim 1, wherein said reserving step comprises providing, to one or more nodes receiving or switching said channel from said bitstream, information requesting that the one or more additional time slots are to be part of said channel.

3. A method as claimed in claim 1 or 2, comprising receiving information from one or more nodes receiving or switching said channel from said bitstream, or downstream thereof, indicating that these are ready to handle payload data pertaining to said channel with respect to the one or more additional time slots, thereby defining the end of said period of time.

4. A method as claimed in claim 1 or 2, comprising receiving information from all nodes receiving or switching said channel from said bitstream, indicating that these are ready to handle payload data pertaining to said channel with respect to the one or more additional time slots, thereby defining the end of said period of time.

5. A method for increasing the bandwidth of a circuit switched channel in a time division multiplexed network, said channel being switched from a first set of time slots within each recurring frame of a first bitstream to a second set of time slots within each recurring frame of a second bitstream, said method comprising the steps of:

receiving information requesting that one or more additional time slots within each recurring frame of the first bitstream are to be part of said channel;

reserving for said channel, in addition to the second set of time slots, one or more additional time slot within each recurring frame of the second bitstream, including using, during a period of time, only the second set of time slots for transmitting payload data mapped from the first set of time slots while providing, during said period of time, information indicating that the one or more additional time slots on said second bitstream are currentlly not used for transferring payload data; and using, after said period of time, the second set of time slots as well as the one or more additional time slots on the second bitstream for transmitting payload data that is mapped from the first set of time slot as well as the one or more additional time slots on the first bitstream.

6. A method as claimed in claim 5, wherein said reserving step comprises the step of providing, to one or more nodes receiving or switching said channel from the second bitstream, information requesting that said one or more additional time slots on said second bitstream are to be part of said channel.

7. A method as claimed in claim 5 or 6, comprising the step of receiving information from one or more nodes receiving or switching said channel from said second bitstream, or downstream thereof, indicating that they are ready to handle payload data pertaining to said channel with respect to the one or more additional time slots on the second bitstream, thereby defining the end of said period of time.

8. A method as claimed in claim 5 or 6, comprising receiving information indicating that all nodes receiving or switching said channel from said bitstream, are ready to handle payload data pertaining to said channel with respect to said one or more additional time slots, thereby defining the end of said period of time.

9. A method as claimed in claim 5 or 6, comprising providing, at the end of or after said period of time, information acknowledging that mapping of payload data from the first set of time slots as well as the one or more additional time slots on the first bitstream to the second bitstream has been established.

10. A method as claimed in claim 5 or 6, wherein any reconfiguring of time slot mapping from the first bitstream to the second bitstream, with respect to the time slots forming said channel, necessary as a result of the change of the amount of time slots allocated to said channel is carried out after the completion of any reconfiguring of time slot mapping performed at one or more nodes receiving or switching said channel from said second bitstream, or downstream thereof.

11. A method as claimed in claim 10, wherein said reconfiguring of time slot mapping from the first bitstream to the second bitstream, with respect to the time slots forming said channel, is further preformed before said bandwidth change is acknowledged to an upstream node being the sender of or switching said channel.

12. A method for decreasing the bandwidth of a circuit switched channel in a time division multiplexed network, said channel comprising a set of time slots within each recurring frame of a bitstream of said network, said method comprising the steps of:

using, during a period of time, only a portion of said set of time slots for transmitting payload data pertaining to said channel while providing, during said period of time, information indicating that the remaining time slots of said set of time slots are curretly not used for transferring payload data; and deallocating, after said period of time, said remaining time slots from said channel while continuing using said portion of said set of time slots for transmitting payload data pertaining to said channel.

13. A method as claimed in claim 12, comprising providing, at the start of said period of time, to one or more nodes receiving or switching said channel from said bitstream, information requesting that said remaining time slots are to be deallocated from said channel.

14. A method as claimed in claim 12 or 13, comprising receiving information, from one or more nodes receiving or switching said channel from said bitstream, indicating that they no longer consider said remaining time slots to be part of said channel, thereby defining the end of said period of time.

15. A method as claimed in claim 12 or 13, comprising receiving information indicating that all nodes receiving or switching said channel from said bitstream no longer consider said remaining time slots to be part of said channel, thereby defining the end of said period of time.

16. A method for increasing the bandwidth of a circuit switched channel in a time division multiplexed network, said channel comprising a set of time slots within each recurring frame of a bitstream between a first and a second node of the network, said method comprising the steps of:

said first node allocating to said channel, in addition to said set of time slots, one or more additional time slots within each frame of said bitstream;

said first node providing, using a control channel on said bitstream, said second node with information requesting that said one or more additional time slot are to be part of said channel;

said first node, while waiting for information confirming that said one or more additional time slots may be used for providing payload data, using only said set of time slots for transmitting payload data pertaining to said channel while providing said one or more additional time slots with information indicating that they are currently not used for transferring payload data;

said second node, after having received said information requesting that said one or more additional time slot are to be part of said channel and having made any necessary arrangements for being able to handle payload data received in said one or more time slots, providing said first node, using a control channel established on a bitstream of the network, with confirmation information indicating that said second node is ready to start receiving payload data from said one or more additional time slots; and said first node, having received said confirmation information, using said first set of time slots as well as said one or more additional time slots on said bitstream for transmitting payload data pertaining to said channel.

17. A method for changing the bandwidth of a circuit switched channel in a time division multiplexed network of the kind wherein data are transferred on bitstreams, each bitstream being divided into recurrent frames and each frame being divided into time slots, wherein an intermediate node provides mapping of time slots allocated to said channel on a first bitstream and time slots allocated to said channel on a second bitstream, said method comprising the step of:

performing, at said intermediate node, any reconfiguring of time slot mapping with respect to the time slots forming said channel at said intermediate node, required as a result of the change of the amount or resources allocated to said channel, after the completion of any required reconfiguring of time slot mapping performed among the time slots forming said channel at a node handling said channel and being arranged downstream with respect to said intermediate node.

18. A method as claimed in claim 17, wherein said reconfiguring of time slot mapping at said intermediate node is further preformed before the bandwidth change is acknowledged to an upstream node being the sender of or switching said channel.

19. A method for increasing the bandwidth of an existing isochronous channel in a circuit switched time division multiplexed network of the kind wherein data are transferred on bitstreams, each bitstream being divided into recurrent frames and each frame being divided into time slots, said isochronous channel comprising a set of time slots within each frame of a bitstream between a first node and a second node, said method comprising the steps of:

allocating to said channel, in addition to said set of time slots, one or more additional time slots within each frame of said bitstream;

using, during a period of time, only a subset of the time slots of the enlarged set of time slots formed by said a set of time slots and said one or more additional time slots for transmitting payload data pertaining to said channel, the number of time slots in said subset of time slots not exceeding the number of time slots in said a set of time slots, and providing, during said period of time, said bitstream with information indicating that the remaining time slots of said enlarged set of time slots are currently not used for transferring payload data; and using, after said period of time, said a set of time slots as well as said one or more additional time slots on said bitstream for transmitting payload data pertaining to said channel.

20. A method as claimed in claim 19, wherein said step of using, during a period of time, only a subset of the time slots comprises:

using, during said period of time, only said a set of time slots for transmitting payload data pertaining to said channel and providing, during said period of time, said bitstream with information indicating that said one or more additional time slots are currently not used for transferring payload data.

21. A method as claimed in claim 19 or 20, wherein the end of said period of time is related to the reception of information indicating that one or more nodes handling said channel are ready to receive payload data pertaining to said channel from said one or more additional time slots.

22. A method as claimed in claim 19 or 20, wherein said first node manages the allocation of said one or more additional time slots to said channel on said bitstream and provides said second node with information requesting that said one or more additional time slots are to be part of said channel.

23. A method as claimed in claim 22, wherein said second node, having received said information requesting that said one or more additional time slots are to be part of said channel and having made any necessary arrangements for being able to handle payload data received in said one or more time slots, provides said first node with confirmation information indicating that said second node is ready to start receiving payload data from said one or more additional time slots.

24. A method as claimed in claim 23, wherein said period of time ends after the reception of said confirmation information at said first node.

25. A method as claimed in claim 19 or 20, wherein said channel further comprises another set of time slots on another bitstream between said second node and a third node, and wherein said method comprises the further steps of:
   allocating to said channel, in addition to said another set of time slots, one or more additional time slots within each frame of said another bitstream; and
   providing mapping between the time slots forming said channel on said a bitstream and the time slots forming said channel on said another bitstream, as well as, or thereby providing, mapping of said information designating the time slots that are currently not used for transferring payload data.

26. A method as claimed in claim 25, wherein said further steps are performed at said second node.

27. A method as claimed in claim 26, wherein said second node, having allocated said one or more additional time slots, having established said mapping, and having made any other necessary arrangements for being able to handle payload data received in said one or more time slots, provides said first node with said confirmation information indicating that said second node is ready to start transferring payload data from said one or more additional time slots allocated to said channel on said a bitstream.

28. A method as claimed in claim 27, wherein said feature of having made said arrangements for being able to handle payload data comprises notifying and receiving acknowledgement from said third node that said one or more additional time slots allocated to said channel on said another bitstream are now to be part of said channel.

29. A method as claimed in claim 27, wherein said period of time ends after the reception of said confirmation information at said first node.

30. A method as claimed in claim 19 or 20, wherein re-mapping to be performed with respect to the time slots forming the channel at said second node, as a result of the change of the amount of resources allocated to said channel, is carried out after the completion of any re-mapping performed among the time slots forming the channel at a node handling said channel and being arranged downstream with respect to said second node.

31. A method for increasing the bandwidth of a multi-casted circuit switched channel in a time division multiplexed network, said channel comprising a set of time slots within each recurring frame of a bitstream of said network, said method comprising the steps of:
   reserving, for said channel, one or more additional time slots within each recurring frame of said bitstream, including using, up to a point in time at which it has been determined that all nodes receiving or switching said mulitcasted channel from, or downstream with respect to, said bitstream has made the necessary arrangements to received payload data with respect to the increased bandwidth presented by said additional time slots, only said set of time slots for transmitting payload data pertaining to said channel while providing information indicating that said one or more additional time slots are currently not used for transferring payload data; and
   using, after said point in time, said set of time slots as well as said one or more additional time slots on said bitstream for transmitting payload data pertaining to said channel.

32. A method as claimed in claim 1, 2, 5, 6, 12, 13, 16, 17, 18, 19, 20, or 31, wherein said information indicating that a time slot is not used for transferring payload data is provided by the step of marking said time slot as being idle.

33. A method as claimed in claim 32, wherein said step of marking said time slot as being idle comprises transmitting idle time slot identifying data, such as an identifiable code word, for said time slot.

34. A method as claimed in claim 1, 2, 5, 6, 12, 13, 16, 17, 18, 19, 20, or 31, wherein said network is a Dynamic synchronous Transfer Mode (DTM) network.

* * * * *

UNITED STATES PATENT AND TRADEMARK OFFICE
CERTIFICATE OF CORRECTION

PATENT NO.    : 6,990,120 B1
DATED         : January 24, 2006
INVENTOR(S)   : Per Lindgren et al.

It is certified that error appears in the above-identified patent and that said Letters Patent is hereby corrected as shown below:

<u>Column 12,</u>
Lines 7 and 18, "slot" should read -- slots --.
Line 14, "currentlly" should read -- currently --.
Line 57, "preformed" should read -- performed --.

<u>Column 13,</u>
Line 2, "curretly" should read -- currently --.
Lines 34 and 44, "slot" should read -- slots --.

<u>Column 14,</u>
Line 10, "preformed" should read -- performed --.

<u>Column 16,</u>
Line 17, "received" should read -- receive --.

Signed and Sealed this

Ninth Day of May, 2006

JON W. DUDAS
*Director of the United States Patent and Trademark Office*